United States Patent
Ueda et al.

(10) Patent No.: US 9,902,849 B2
(45) Date of Patent: Feb. 27, 2018

(54) RESIN MODIFIER, POLYCARBONATE RESIN COMPOSITION AND MOLDED ARTICLE THEREOF

(71) Applicant: Mitsubishi Rayon Co., Ltd., Tokyo (JP)

(72) Inventors: Masahiro Ueda, Otake (JP); Toshihiro Kasai, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1 day.

(21) Appl. No.: 14/381,791

(22) PCT Filed: Feb. 25, 2013

(86) PCT No.: PCT/JP2013/054755
§ 371 (c)(1),
(2) Date: Aug. 28, 2014

(87) PCT Pub. No.: WO2013/129310
PCT Pub. Date: Sep. 6, 2013

(65) Prior Publication Data
US 2015/0045483 A1    Feb. 12, 2015

(30) Foreign Application Priority Data
Feb. 29, 2012 (JP) .................. 2012-043529

(51) Int. Cl.
C08L 27/18 (2006.01)
C08F 2/24 (2006.01)
C08L 69/00 (2006.01)
C08K 5/42 (2006.01)
C08L 33/12 (2006.01)

(52) U.S. Cl.
CPC ............... *C08L 27/18* (2013.01); *C08F 2/24* (2013.01); *C08K 5/42* (2013.01); *C08L 33/12* (2013.01); *C08L 69/00* (2013.01)

(58) Field of Classification Search
CPC .............. C08L 27/18; C08L 33/08–33/12
See application file for complete search history.

(56) References Cited

U.S. PATENT DOCUMENTS

2009/0239991 A1    9/2009  Avtomonov et al.

FOREIGN PATENT DOCUMENTS

| CN | 101255271 A | 9/2008 |
|---|---|---|
| CN | 101952368 A | 1/2011 |
| JP | 2002-060612 A | 2/2002 |
| JP | 2002-275366 A | 9/2002 |
| JP | 2003-261875 A | 9/2003 |
| JP | 2004-075800 A | 3/2004 |
| JP | 2005-281486 A | 10/2005 |
| JP | 2007-106953 A | 4/2007 |
| JP | 2011-515545 A | 5/2011 |
| WO | 2009/118114 A1 | 10/2009 |
| WO | 2012/043754 A1 | 4/2012 |

OTHER PUBLICATIONS

Machine translation of JP2007-106953, 2007.*
Extended European Search Report issued in counterpart European Patent Application No. 13755928.2 dated Apr. 10, 2015.
International Search Report issued in corresponding International Patent Application No. PCT/JP2013/054755 dated Mar. 26, 2013.
Office Action issued in counterpart Chinese Patent Application No. 201380011466.5 dated Apr. 30, 2015.

* cited by examiner

*Primary Examiner* — Wenwen Cai
(74) *Attorney, Agent, or Firm* — Morgan, Lewis & Bockius LLP

(57) ABSTRACT

A polycarbonate resin composition and a molded article thereof are described, which have good flame retardance and high thermal stability when molded under high temperature. The resin composition contains a resin modifier (B) containing a tetrafluoroethylene-based polymer (p1) and a vinyl polymer (p2) other than the polymer (p1). The resin modifier (B) is obtained by using an alkaline (earth) metal salt other than a sulfate salt to coagulate a latex containing the polymer (p1) and the polymer (p2). The polymer (p2) is formed by performing polymerization on a vinyl monomer (X) containing at least 20 mass % of an aromatic vinyl monomer (x1) in the presence of at least one emulsifier selected from a phosphoric acid-based emulsifier, a carboxylic acid-based emulsifier, and a nonionic emulsifier.

16 Claims, No Drawings

RESIN MODIFIER, POLYCARBONATE RESIN COMPOSITION AND MOLDED ARTICLE THEREOF

TECHNICAL FIELD

This invention relates to a resin modifier, a polycarbonate resin composition containing the resin modifier, and a molded article of the resin composition.

BACKGROUND ART

Due to its good mechanical properties, dimensional accuracy and electrical properties, etc., the polycarbonate resin is used in a variety of applications ranging from industrial fields, such as the electrical/electronic equipment field, the office automation (OA) equipment field and the automotive field, to groceries, medical supplies, security products and entertainment products. In recent years, particularly in the fields centered on the electrical/electronic equipment and the OA equipment, with wall thinning of the molded article for cost reduction or weight reduction, higher flame retardance is needed for the polycarbonate resin. Moreover, to obtain a molded article having a thin wall, the molding temperature of the polycarbonate resin composition is set at a high temperature.

Polytetrafluoroethylene (sometimes called "PTFE" hereinafter) has the characteristic of fibrosis through a minor stress due to its high crystallinity and low intermolecular force. Therefore, by mixing PTFE in a resin and fiberizing the same, melt tension can be provided to the resin. As a result, falling of flame drops when the resin is burnt is suppressed to suppress spreading of the burning. Therefore, previously, PTFE and a flame retardant were used together as an additive for various resins represented by polycarbonate resin.

The compatibility of PTFE with almost all thermoplastic resins is poor, and if PTFE is only added in a resin composition and simply blended, the PTFE is not readily uniformly dispersed in the resin composition. As a result, PTFE aggregates are readily formed in the resin composition, causing the appearance of the formed article to be poor and increasing the addition amount needed for the flame retardance performance. If the content of PTFE is increased in the resin composition, mechanical properties such as impact resistance of the molded article are reduced. Thus, a resin modifier containing PTFE and an organic polymer is used such that the PTFE can be dispersed in the resin composition in a satisfactory manner.

However, when the resin composition is molded under high temperature, the issue of compromise to the appearance or the flame retardance, etc. of the molded article due to byproducts remaining in the resin modifier or thermal decomposition of the organic polymer is present. As a result, improvement of thermal stability of the resin composition when molded under high temperature is an important topic.

Moreover, from the perspective of reducing environmental burden, a polycarbonate resin composition still having good flame retardance in a molded article having a thin wall without use of the prior bromine-based compound or phosphorus-based compound used as the flame retardant is also in strong demand.

In a method without using a bromine-based or phosphorus-based compound, a resin composition (Patent Document 1) in which a mixture of an organic sulfonate metal salt, an acrylic acid-based resin, and PTFE is prepared and used in a polycarbonate resin is proposed. However, in the method recited in Patent Document 1, since the acrylic acid-based resin does not contain an aromatic vinyl monomer unit, the thermal stability of the resin composition may be insufficient when molded under high temperature.

Moreover, in a method in which the reduction of hydrolysis resistance or thermal stability of the polycarbonate resin composition caused by byproducts in the resin modifier is suppressed, a resin composition (Patent Document 2), which is obtained by mixing in a polycarbonate resin a rubber-modified graft polymer that is formed with polymerization in the presence of an alkali metal salt of a saturated fatty acid, is proposed. However, in the method recited in Patent Document 2, since a sulfate salt is used in the latex of the rubber-modified graft polymer when the polymer solid content is recycled as a powder, the thermal stability of the resin composition may be insufficient when molded under high temperature.

CITATION LIST

Patent Literature

[Patent Literature 1] Japanese Patent Laid-Open Publication No. 2004-75800
[Patent Literature 2] Japanese Unexamined Patent Application Publication (Translation of PCT Application) No. 2011-515545

SUMMARY OF INVENTION

Technical Problem

Accordingly, this invention provides a polycarbonate resin composition having good flame retardance and high thermal stability when molded under high temperature without using a bromine-based or phosphorus-based compound, and a molded article of the same. This invention also provides a resin modifier capable of being mixed with a polycarbonate resin to obtain a polycarbonate resin composition having good flame retardance and good thermal stability when molded under high temperature.

Solution to Problem

The above issues are addressed by the following items [1] to [10] of this invention.

Item [1] is a resin modifier (B) containing a tetrafluoroethylene-based polymer (p1) and a vinyl polymer (p2) other than the polymer, and making the following resin composition containing it meet the following conditions [1] and [2], wherein the resin composition comprises:
1 part by mass of the resin modifier (B),
100 parts by mass of a polycarbonate resin represented by formula (1) and having a viscosity-average molecular weight (Mv) of 23000,
0.1 part by mass of a phenol-based antioxidant represented by formula (2),
0.1 part by mass of a phosphite-based antioxidant represented by formula (3), and
0.05 parts by mass of potassium perfluorobutanesulfonate;

the viscosity-average molecular weight of the polycarbonate resin is obtained by measuring the limiting viscosity [η] of a 0.5 g/dL methylene chloride solution at 25° C. with a Ubbelohde viscometer and the following equation:

$$[\eta] = 1.23 \times 10^{-4} \mathrm{Mv}^{0.83};$$

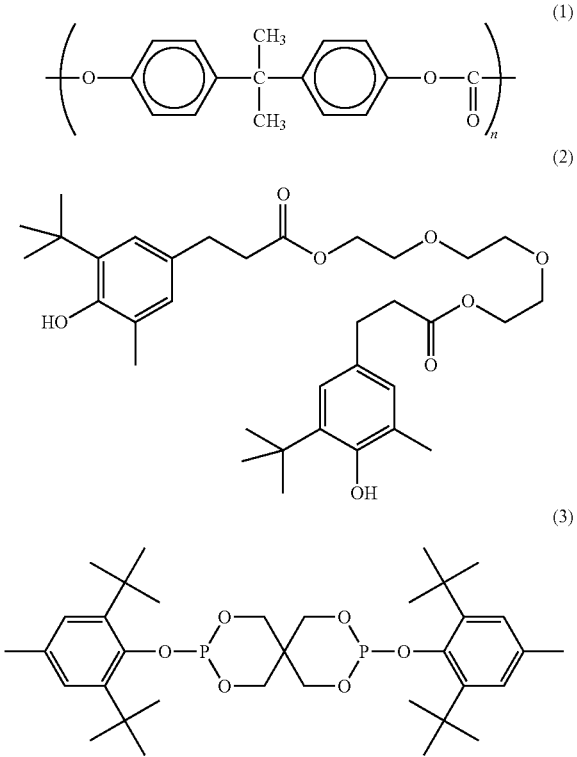

the condition [1] is:

$\Delta MFR = (MFR_A - MFR_B)/MFR_B \times 100(\%) \le 30(\%)$, wherein $MFR_B$ is the melt mass-flow rate of the resin composition measured under the conditions of a cylinder temperature of 320° C. and a load of 1.2 kg according to ISO1133, and $MFR_A$ is the melt mass-flow rate of the resin composition measured after being left in a cylinder at a temperature of 320° C. for 15 minutes under the condition of a load of 1.2 kg according to ISO1133; and the condition [2] is:

YI (yellowness index) value of slab≤−20, wherein the YI value of the slab is measured by a reflected-light measurement method under the conditions of a C-light source and a viewing angle of 2° with a light-splitting colorimeter according to JIS K7105, the dimensions of the slab are a length of 100 mm, a width of 50 mm, and a thickness of 2 mm, and the slab is made by performing injection molding after the resin composition is left in the cylinder of an injection molding machine at a cylinder temperature set at 300° C. for 15 minutes.

Item [2] is the resin modifier (B) of item [1] which is obtained by using an alkaline (earth) metal salt other than a sulfate salt to coagulate a latex containing the tetrafluoroethylene-based polymer (p1) and the vinyl polymer (p2) other than the polymer (p1), wherein the vinyl polymer (p2) is obtained by performing polymerization on a vinyl monomer (X) containing at least 20 mass % of an aromatic vinyl monomer (x1) in the presence of at least one emulsifier selected from a phosphoric acid-based emulsifier, a carboxylic acid-based emulsifier, and a nonionic emulsifier.

Item [3] is the resin modifier (B) of item [1] or [2] in which the vinyl monomer (X) contains a (meth)acrylate (x2) that has, in its ester moiety, an alkyl group having 1 to 20 carbons or an aromatic group.

Item [4] is the resin modifier (B) of any one of items [1] to [3] in which the mass-average molecular weight of the tetrafluoroethylene-based polymer (p1) is 1 million to 50 million.

Item [5] is the resin modifier (B) of any one of items [1] to [4] in which the content of the tetrafluoroethylene-based polymer (p1) is 30 mass % to 70 mass % based on a total of 100 mass % of the tetrafluoroethylene-based polymer (p1) and the vinyl polymer (p2).

Item [6] is the resin modifier (B) of any one of items [1] to [5] in which the vinyl polymer (p2) is obtained by polymerizing 100 parts by mass of the vinyl monomer (X) in the presence of an emulsifier of more than 1.5 parts by mass and no more than 10 parts by mass.

Item [7] is a polycarbonate resin composition containing a polycarbonate resin (A), an organic metal salt (C), and the resin modifier (B) of any one of items [1] to [6].

Item [8] is the polycarbonate resin composition of item [7] in which the content of the organic metal salt (C) is 0.001 to 2 parts by mass and the content of the resin modifier (B) is 0.001 to 30 parts by mass based on 100 parts by mass of the polycarbonate resin (A).

Item [9] is the polycarbonate resin composition of item [7] or [8] in which the organic metal salt (C) is a metal salt of a fluorine-free organic sulfonic acid.

Item [10] is a molded article obtained by molding the polycarbonate resin composition of any one of items [7] to [9].

Item [11] is a method for manufacturing a molded article which comprises molding the polycarbonate resin composition of any one of [7] to [9] at a temperature of 285° C. to 340° C.

Item [12] is a method for producing a resin modifier (B) which comprises using an alkaline (earth) metal salt other than a sulfate salt to coagulate a latex containing a tetrafluoroethylene-based polymer (p1) and a vinyl polymer (p2) other than the polymer (p1), wherein the vinyl polymer (p2) is obtained by polymerizing a vinyl monomer (X) containing at least 20 mass % of an aromatic vinyl monomer (x1) in the presence of at least one emulsifier selected from a phosphoric acid-based emulsifier, a carboxylic acid-based emulsifier, and a nonionic emulsifier.

Advantageous Effects of Invention

According to this invention, a polycarbonate resin composition having good flame retardance and good thermal stability when molded under high temperature without use of a bromine-based or phosphorus-based compound, and a molded article thereof can be provided. Moreover, according to this invention, a resin modifier that can be mixed with a polycarbonate resin to obtain a polycarbonate resin composition having good flame retardance and good thermal stability when molded under high temperature can be provided.

DESCRIPTION OF EMBODIMENTS

In the following, embodiments of this invention are described in detail.

<Resin Modifier (B)>

The resin modifier (B) of this invention contains a tetrafluoroethylene-based polymer (p1) and a vinyl polymer (p2), is used and functions as an anti-dripping agent, and has the effect of increasing the flame retardance of a resin composition. The resin modifier (B) may further contain a small amount of a polymerization auxiliary agent or a coagulation agent such as a polymerization initiator or an emulsifier. The amount of the polymerization auxiliary agent or the coagulation agent is preferably 0.01 to 1 mass % based on a total of 100 mass % of the tetrafluoroethylene-based polymer (p1) and the vinyl polymer (p2).

[Tetrafluoroethylene-Based Polymer (p1)]

The tetrafluoroethylene-based polymer (p1) (hereinafter "PTFE-based polymer (p1)") used in this invention is a homopolymer only containing a tetrafluoroethylene monomer unit or a copolymer containing a tetrafluoroethylene monomer unit and other monomer unit(s). Specific examples of the other monomers used to copolymerize with tetrafluoroethylene can include, e.g., a fluorine-containing olefin such as hexafluoropropylene, chlorotrifluoroethylene and fluoroalkyl ethylene, and a fluorine-containing alkyl (meth)acrylate such as perfluoroalkyl (meth)acrylate. The "other monomers" can be used without compromise to the characteristic of the tetrafluoroethylene improving the melt tension of the resin composition, and the content thereof in 100 mass % of the PTFE-based polymer (p1) is preferably no more than 10 mass %.

The mass-average molecular weight of the PTFE-based polymer (p1) is preferably 1 to 50 million, more preferably 3 to 30 million, and even more preferably 5 to 20 million. If the mass-average molecular weight is at least 1 million, then in a case that the resin modifier (B) is mixed in the polycarbonate resin (A), the melt tension of the obtained resin composition is sufficiently increased. As a result, falling of flame drops when the molded article made by the resin composition is burned can be prevented. Moreover, if the mass-average molecular weight is no more than 50 million, then in a case that the resin modifier (B) is mixed in the polycarbonate resin (A), the dispersibility of the PTFE-based polymer (p1) in the obtained resin composition is good, so a molded article with good surface appearance can be obtained.

Moreover, the "mass-average molecular weight" is calculated according to the following equation after the crystallization heat of a polymer sample cooled from 370° C. to 20° C. is measured by using a differential thermal analysis apparatus:

$$M=2.1\times10^{10}\times\Delta Hc^{-5.16},$$

wherein M is the mass-average molecular weight and ΔHc is the crystallization heat (cal/g).

In this invention, the content of the PTFE-based polymer (p1) in the resin modifier (B) is not particularly limited, but from the following perspective, the content of the PTFE-based polymer (p1) is preferably 30 to 70 mass % and more preferably 40 to 60 mass % based on a total of 100 mass % of the PTFE-based polymer (p1) and the vinyl polymer (p2). If the content of the PTFE-based polymer (p1) is at least 30 mass %, in a case that the PTFE-based polymer (p1) is prepared in the polycarbonate resin (A), the flame retardance of the obtained resin composition is good. Moreover, if the content of the PTFE-based polymer (p1) is no more than 70 mass %, the dispersibility of the PTFE-based polymer (p1) in the polycarbonate resin (A) is good, and the operability of the powder is good. As a result, a molded article having good surface appearance can be obtained.

In producing the resin modifier (B), from the perspective of ready mixing of the PTFE-based polymer (p1) and the vinyl polymer (p2), a latex formed by dissolving the polymer (p1) in water is preferably used for the polymer (p1).

Specific examples of commercial products for the latex containing the polymer (p1) include, e.g., Fluon AD911L, Fluon AD912L, Fluon AD915E, and Fluon AD939E of Asahi Glass Co., Ltd., and Polyflon D-210C of Daikin Industries Co., Ltd. The latices can be used alone or in combination of two or more.

[Vinyl Polymer (p2)]

In this invention, the vinyl polymer (p2) can be obtained by polymerizing the vinyl monomer (X) containing at least 20 mass % of the aromatic vinyl monomer (x1).

[Vinyl Monomer (X)]

The content of the aromatic vinyl monomer (x1) in the vinyl monomer (X) is preferably 20 to 80 mass %, more preferably 25 to 75 mass %, even more preferably 30 to 70 mass %, and most preferably 40 to 60 mass %. In a case that the content of the aromatic vinyl monomer (x1) is at least 20 mass %, the thermal stability of the resin composition formed by mixing the obtained resin modifier (B) in the polycarbonate resin (A) is good. Moreover, in a case that the content of the aromatic vinyl monomer (x1) is no more than 80 mass %, the dispersibility of the resin modifier (B) in the polycarbonate resin (A) is good. As a result, the appearance or the flame retardance of the obtained molded article is good.

Specific examples of the aromatic vinyl monomer (x1) include, for example, styrene, α-methylstyrene, p-methylstyrene, p-t-butylstyrene, p-methoxystyrene, o-methoxystyrene, 2,4-dimethoxystyrene, chlorostyrene, bromostyrene, vinyl toluene, vinylnaphthalene, vinylanthracene, and divinylbenzene. The monomers can be used alone or in combination of two or more. Among them, from the perspective of increasing the polymerization rate of the vinyl monomer (X) and the perspective of making the index of refraction of the obtained vinyl polymer (p2) approach that of the polycarbonate resin (A), styrene, a-methylstyrene, p-methylstyrene, or p-t-butylstyrene is preferred, and styrene is more preferred.

The vinyl monomer (X) preferably contains a (meth)acrylate (x2) that has, in its ester moiety, an alkyl group containing 1 to 20 carbons or an aromatic group. The content of the (meth)acrylate (x2) in the vinyl monomer (X) is preferably 20 to 80 mass %, more preferably 25 to 75 mass %, even more preferably 30 to 70 mass %, and most preferably 40 to 60 mass %. If the content is at least 20 mass %, dispersibility of the resin modifier (B) in the polycarbonate resin (A) is good, so the appearance or the flame retardance of the obtained molded article is good. Moreover, if the content is no more than 80 mass %, the thermal stability of the resin composition formed by mixing the resin modifier (B) in the polycarbonate resin (A) is good.

Specific examples of the (meth)acrylate of which the ester moiety is an alkyl group having 1 to 20 carbons include, e.g., methyl (meth)acrylate, ethyl (meth)acrylate, propyl (meth)acrylate, butyl (meth)acrylate, n-hexyl (meth)acrylate, cyclohexyl (meth)acrylate, n-octyl (meth)acrylate, 2-ethylhexyl (meth)acrylate, dodecyl (meth)acrylate, stearyl (meth)acrylate, and isobornyl (meth)acrylate. The alkyl group can be a straight chain or a branched chain. The monomers can be used alone or in combination of 2 or more. Among them, from the perspective of dispersibility of the resin modifier (B) in the polycarbonate resin (A), a (meth)acrylate of which the ester moiety is an alkyl group of 1-8 carbons is preferred, a (meth)acrylate of which the ester moiety is an alkyl group of 1-4 carbons is more preferred, methyl (meth)acrylate, ethyl (meth)acrylate, or n-propyl (meth)acrylate is even more preferred, methyl (meth)acrylate or ethyl (meth)acrylate is still more preferred, methyl (meth)acrylate is most preferred. From the perspective of powder recyclability and powder operability of the resin modifier (B), n-butyl acrylate having a low homopolymer glass transition temperature is preferred. Hence, preferably, methyl (meth)acrylate and n-butyl acrylate are used together.

Specific examples of the (meth)acrylate of which the ester moiety is an aromatic group include, e.g., phenyl (meth)acrylate, 4-t-butylphenyl (meth)acrylate, bromophenyl (meth)acrylate, dibromophenyl (meth)acrylate, 2,4,6-tribromophenyl (meth)acrylate, chlorophenyl (meth)acrylate, dichlorophenyl (meth)acrylate, trichlorophenyl (meth)acrylate, and benzyl (meth)acrylate. The monomers can be used alone or in combination of two or more. Among them, from the perspective of obtaining the resin modifier (B) having good dispersibility in the polycarbonate resin (A) and the perspective of obtaining a molded article having good appearance or flame retardance, phenyl (meth)acrylate or benzyl (meth)acrylate is preferred, and phenyl (meth)acrylate is more preferred.

The vinyl monomer (X) may also contain copolymerizable "other monomer(s) (x3)" without compromise to the object of this invention. Specific examples of the monomer (x3) include, e.g., an alkyl ester of (meth)acrylic acid having at least 21 carbons; a carboxyl-containing monomer such as (meth)acrylic acid or carboxyethyl (meth)acrylate; a hydroxyl-containing monomer such as 2-hydroxyethyl (meth)acrylate or hydroxypropyl (meth)acrylate; a vinyl cyanide monomer such as (meth)acrylonitrile; a vinyl ether monomer such as vinyl methyl ether or vinyl ethyl ether; a vinyl carboxylate monomer such as vinyl benzoate, vinyl acetate, or vinyl butyrate; a (meth)acrylate having a reactive functional group such as glycidyl (meth)acrylate, allyl (meth)acrylate, 1,3-butanediol di(meth)acrylate, ethylene glycol di(meth)acrylate, or polybutylene glycol di(meth)acrylate; and an alkene such as ethylene, propylene, or butylene. The monomers (x3) can be used alone or in combination of two or more.

In a case that the monomer (x3) is used, the content of the monomers (x3) in the vinyl monomer (X) is preferably 0 to 20 mass %.

In this invention, the vinyl monomer (X) is polymerized by emulsion polymerization or soap-free emulsion polymerization. Among them, in terms of ready coagulation, emulsion polymerization is preferred.

The polymerization initiator used to polymerize the vinyl monomer (X) is not particularly limited, and may be a known one. Specific examples are, e.g., a persulfate, an organic peroxide, an azo initiator, a redox-based initiator as a combination of a persulfate and a reducing agent, and a redox-based initiator as a combination of an organic peroxide and a reducing agent. These can be used alone or in combination of two or more.

[Emulsifier]

The emulsifier used in the emulsion polymerization of the vinyl monomer (X) is at least one selected from the group consisting of a phosphoric acid-based emulsifier, a carboxylic acid-based emulsifier, and a non-ionic emulsifier. After a latex containing the vinyl polymer (p2) is subjected to coagulation, a trace amount of the emulsifier remains in the resin modifier (B) in the state of an acid or a base, or a salt. As a result, when the polycarbonate resin (A), the resin modifier (B), and an organic metal salt (C) are mixed, the polycarbonate resin (A) may be decomposed. In particular, the higher the acidity of the organic metal salt (C), the more readily ions get free from the remnant of the emulsifier, thus facilitating decomposition of the polycarbonate resin (A).

Hence, a phosphoric acid-based or carboxylic acid-based emulsifier having low acidity when ionized, or a non-ionic emulsifier without ionization is preferred. Moreover, a sulfonic acid-based emulsifier is unsatisfactory.

Specific examples of the phosphoric acid-based emulsifier include, e.g., polyoxyethylene phenyl ether phosphate, polyoxyethylene alkyl phenyl ether phosphate, polyoxyethylene alkyl ether phosphate, and alkyl phosphate. These phosphoric acid-based emulsifiers can be in the acid form, or in a salt form of sodium salt or potassium salt.

Specific examples of commercial products for the phosphoric acid-based emulsifier include, e.g., Phosphanol ML-200, Phosphanol GF-199, Phosphanol RA-600, Phosphanol RS-610NA, Phosphanol SC-6103, and Phosphanol LP-700 produced by Toho Chemical Industry Co., Ltd.

Examples of the carboxylic acid-based emulsifier are, e.g., a metal salt of a saturated/unsaturated fatty acid having an alkyl group having 8 to 28 carbons such as caprylic acid, pelargonic acid, capric acid, lauric acid, myristic acid, palmitic acid, margaric acid, stearic acid, arachidic acid, behenic acid, lignoceric acid, cerotic acid, montanic acid, myristoleic acid, palmitoleic acid, oleic acid, elaidic acid, vaccenic acid, ricinoleic acid, gadoleic acid, eicosenoic acid, erucic acid, nervonic acid, linoleic acid, eicosadienoic acid, docosadienoic acid, linolenic acid, pinolenic acid, eleostearic acid, mead acid, eicosatrienoic acid, stearidonic acid, arachidonic acid, eicosatetraenoic acid, adrenic acid, bosseopentaenoic acid, eicosapentaenoic acid, osbond acid, clupanodonic acid, tetracosapentaenoic acid, docosahexaenoic acid, or nisinic acid; a metal salt of an oligo-carboxylic acid compound such as alkenylsuccinate; and a metal salt of a sarcosine derivative such as N-lauroyl sarcosine or N-cocoyl sarcosine.

Specific examples of commercial products for the carboxylic acid-based emulsifier include, e.g., NS SOAP, SS-40N, FR-14, FR-25, and Latemul ASK produced by Kao Co. Ltd., and Diprosin K-25 and Neoscoap SLN-100 produced by Toho Chemical Industry Co. Ltd.

Examples of the non-ionic emulsifier include, e.g., polyoxyalkylene alkyl ether, polyoxyethylene alkylene alkyl ether, polyoxyethylene distyrenated phenyl ether, polyoxyethylene tribenzyl phenyl ether, sorbitan fatty acid ester, polyoxyethylene sorbitan fatty acid ester, and polyoxyethylene fatty acid ester, etc.

Specific examples of commercial products for the non-ionic emulsifier include, e.g., Emulgen 120, Emulgen LS-114, Emulgen A-90, Rheodol SP-L10, Rheodol TW-L120, and Emanon 1112 produced by Kao Co. Ltd.

The above phosphoric acid-based emulsifier, carboxylic acid-based emulsifier, and non-ionic emulsifier can be used alone or in combination of two or more. Moreover, for ready coagulation, among the above emulsifiers, at least one of the phosphoric acid-based emulsifier and the carboxylic acid-based emulsifier is preferably selected.

The usage amount of the emulsifier is not particularly limited. Based on 100 parts by mass of the vinyl monomer (X), the usage amount of the emulsifier is preferably 0.1 to 20.0 parts by mass, more preferably 0.1 to 15.0 parts by mass, and more preferably 0.1 to 10.0 parts by mass, even more preferably 0.1 to 8.0 parts by mass, and most preferably more than 1.5 parts by mass and no more than 10 parts by mass. If the usage amount of the emulsifier is at least 0.1 parts by mass, the emulsion stability is good. If the usage amount is no more than 20.0 parts by mass, the coagulation of a latex containing the PTFE-based polymer (p1) is easy.

[Coagulation Agent]

The resin modifier (B) of this invention is obtained by preparing a latex (d) containing the PTFE-based polymer (p1) and the vinyl polymer (p2), using an alkaline (earth) metal salt other than a sulfate salt to coagulate the latex (d), and then converting the resultant precipitate into powder. The latex (d) can be obtained by, e.g., a method in which the vinyl monomer (X) is polymerized in a latex containing the PTFE-based polymer (p1), or a method in which a latex containing the PTFE-based polymer (p1) and a latex containing the vinyl polymer (p2) are mixed.

In the case that the vinyl monomer (X) is polymerized in a latex containing the PTFE-based polymer (p1), the vinyl monomer (X) can be added to a reaction vessel all at once, successively, or dropwise in a continuous manner. In the case that a latex containing the PTFE-based polymer (p1) and a latex containing the vinyl polymer (p2) are mixed, a known method can be used to perform the mixing of these latices. For instance, a specific amount of a latex containing the PTFE-based polymer (p1) and a specific amount of a latex containing the vinyl polymer (p2) can be added to a vessel and stirred. The mixing of the two latices can be performed in one step, successively, or dropwise in a continuous manner. Moreover, the mixing can also be performed under a heating condition.

Moreover, in the case that 2 kinds of vinyl polymers are used, the vinyl monomer (X) can be polymerized in a solution in which two latices are mixed. Alternatively, after the vinyl monomer (X) is polymerized in a latex containing the PTFE-based polymer (0), the vinyl polymer (p2) is mixed therewith.

The latex (d) containing the PTFE-based polymer (p1) and the vinyl polymer (p2) can also be subjected to coagulation after being mixed with "other liquid substances (e)" as needed. Specific examples of the liquid substances (e) include, e.g., the aqueous dispersion of an antioxidant, and a liquid antioxidant. The liquid substances (e) can be used alone or in combination of two or more. The content (converted to amount of active ingredient) of the liquid substances (e) is, based on 100 parts by mass of the solid resin component in the latex, preferably 0 to 10 parts by mass, more preferably 0.01 to 5 parts by mass, and more preferably 0.1 to 3 parts by mass.

A known method can be used to mix the liquid substances (e) and the latex (d). For instance, a specific amount of the liquid substances (e) and the latex (d) may be added to a vessel and then stirred at room temperature. The mixing can be performed in one step, successively, or dropwise in a continuous manner. Moreover, the mixing can be performed under a heating condition, and can also be performed in the coagulation of a latex.

The coagulation method for the latex (d) containing the PTFE-based polymer (p1) and the vinyl polymer (p2) of this invention may be, e.g., a method in which the latex (d) is brought in contact with a hot water in which a coagulation agent is dissolved, a slurry is formed by coagulation on stirring, and then the resulting precipitate is dehydrated and dried.

At this moment, if the coagulation agent is a sulfate salt, when the polycarbonate resin (A) and the resin modifier are mixed, the sulfate salt remaining in a trace amount sourced from the coagulation agent in the obtained resin modifier readily facilitates the decomposition of the polycarbonate resin (A). A sulfate salt is thus unsuitable as a coagulation agent, so in this invention, an alkaline (earth) metal salt other than a sulfate salt is used as the coagulation agent.

Specific examples of the alkaline (earth) metal salt other than a sulfate salt are, e.g., alkaline (earth) metal salts of organic acids, such as sodium formate, potassium formate, calcium formate, magnesium formate, barium formate, sodium acetate, potassium acetate, calcium acetate, magnesium acetate, and barium acetate; and alkaline (earth) metal salts of inorganic acids other than sulfuric acid, such as sodium chloride, potassium chloride, calcium chloride, magnesium chloride, barium chloride, sodium phosphate, potassium phosphate, or calcium phosphate. The coagulation agents can be used alone or in combination of two or more. The coagulation agents can be used in the form of aqueous solutions and are thus highly water-soluble. Further, the coagulation agent preferably forms a salt not readily dissociated with the emulsifier contained in the latex containing the PTFE-based polymer (p1) during coagulation. The reason is that, even if such a coagulation agent remains in a trace amount in the resin modifier (B), the thermal stability of the resin composition formed by mixing the resin modifier (B) in the polycarbonate resin (A) is still not readily reduced. From the above two perspectives, among the above coagulation agents, alkaline earth metal salts of organic acids or alkaline earth metal salts of inorganic acids other than sulfuric acid are preferred. In particular, calcium salt and magnesium salt are more preferred, and calcium acetate or calcium chloride are even more preferred.

The usage amount of the coagulation agent is not particularly limited, provided the usage amount can sufficiently induce coagulation of a latex. Based on 100 parts by mass of the resin solid content in the latex (d) containing the PTFE-based polymer (p1) and the vinyl polymer (p2), the usage amount is preferably 0.1 to 20 parts by mass, more preferably 0.1 to 12 parts by mass, even more preferably 0.5 to 10 parts by mass, and most preferably 0.5 to 8 parts by mass. If the usage amount of the coagulation agent is at least 0.1 parts by mass, the powder recyclability and the power operability of the resin modifier (B) are good. If the usage amount of the coagulation agent is no more than 20 mass %, the thermal stability of the resin composition formed by mixing the obtained resin modifier (B) in the polycarbonate resin (A) is good.

For the resin modifier (B), the following resin composition containing the resin modifier (B) preferably meets the following condition [1] and condition [2].

The resin composition comprises:
1 part by mass of the resin modifier (B),
100 parts by mass of a polycarbonate resin represented by the following formula (1) and having a viscosity-average molecular weight (Mv) of 23000,
0.1 parts by mass of a phenol-based antioxidant represented by the following formula (2),
0.1 parts by mass of a phosphite-based antioxidant represented by the following formula (3), and,
0.05 parts by mass of potassium perfluorobutanesulfonate.

The viscosity-average molecular weight of the above polycarbonate resin is obtained by measuring the limiting viscosity [η] of a 0.5 g/dL methylene chloride solution at 25° C. with a Ubbelohde viscometer and the following equation:

$[\eta] = 1.23 \times 10^{-4} Mv^{0.83}$;

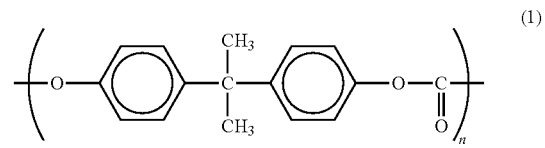

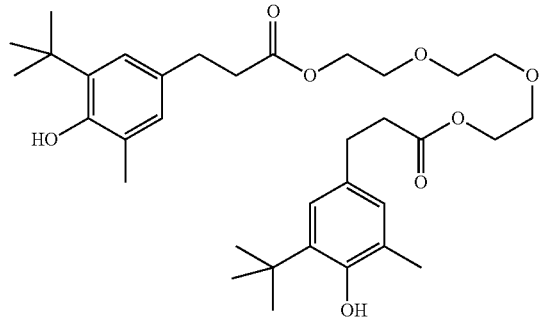

(2)

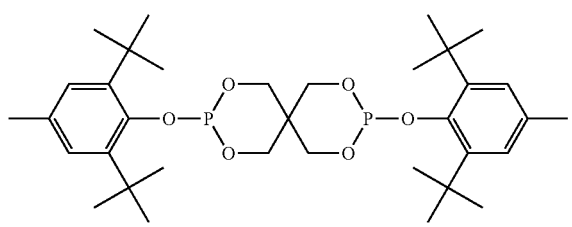

(3)

The condition [1] is:

$$\Delta MFR = (MFR_A - MFR_B)/MFR_B \times 100(\%) \leq 30(\%),$$

wherein $MFR_B$ is the melt mass-flow rate of the resin composition measured under the conditions of a cylinder temperature of 320° C. and a load of 1.2 kg according to ISO1133, and $MFR_A$ is the melt mass-flow rate of the resin composition measured after being left in a cylinder at a temperature of 320° C. for 15 minutes under the condition of a load of 1.2 kg according to ISO1133.

The condition [2] is:

YI (yellowness index) value of slab$\leq -20$.

In particular, the YI value of the slab is measured by a reflected-light measurement method under conditions of a C-light source and a viewing angle of 2° with a light-splitting colorimeter according to JIS K7105. The dimensions of the slab are a length of 100 mm, a width of 50 mm, and a thickness of 2 mm. The slab is made by performing injection molding after the resin composition is left in the cylinder of an injection molding machine at a cylinder temperature set at 300° C. for 15 minutes.

To make the resin composition containing the resin modifier (B) meet the above conditions [1] and [2], preferably, when the resin modifier (B) is made, the vinyl monomer (X) containing at least 20 mass % of the aromatic vinyl monomer (x1) is polymerized in presence of at least one emulsifier selected from the group consisting of a phosphoric acid-based emulsifier, a carboxylic acid-based emulsifier, and a non-ionic emulsifier to obtain the vinyl polymer (p2). Moreover, preferably, the vinyl monomer (X) is polymerized without a sulfonic acid-based emulsifier to obtain the vinyl polymer (p2).

Furthermore, preferably, a latex containing the tetrafluoroethylene-based polymer (p1) and the vinyl polymer (p2) other than the polymer (p1) is subjected to coagulation using an alkaline (earth) metal salt other than a sulfate salt to obtain the resin modifier (B).

<Resin Composition>

The polycarbonate resin composition of this invention contains the polycarbonate resin (A), the organic metal salt (C), and the resin modifier (B).

[Polycarbonate Resin (A)]

In this invention, any known polycarbonate resin can be used as the polycarbonate resin (A), that is, an aromatic polycarbonate resin, an aliphatic polycarbonate resin, or an aromatic-aliphatic polycarbonate resin can be used as the polycarbonate resin. In terms of good impact strength or thermal stability, an aromatic polycarbonate resin is preferred.

The aromatic polycarbonate resin is a polymer obtained by, e.g., a phosgene method in which a dihydroxydiaryl compounds is reacted with phosgene, or a transesterification method in which a dihydroxydiaryl compound is reacted with a carbonate ester such as diphenyl carbonate. Specific examples of the representative polycarbonate include, e.g., a polycarbonate made from 2,2-bis(4-hydroxyphenyl)propane (bisphenol A).

In addition to bisphenol A, the following compounds can also be used as the above dihydroxydiaryl compound: bis(4-hydroxyphenyl)methane, 1,1-bis(4-hydroxyphenyl)ethane, 2,2-bis(4-hydroxyphenyl)butane, and bis(4-hydroxyphenyl)phenylmethane, etc. The compounds can be used alone or in combination of two or more.

In this invention, the viscosity-average molecular weight of the polycarbonate resin (A) is a value converted from a solution viscosity measured at a temperature of 25° C. by using methylene chloride as a solvent, and is preferably 10000 to 40000, more preferably 15000 to 30000. If the viscosity-average molecular weight of the polycarbonate resin (A) is at least 10000, the effect of preventing flame drops from falling when the molded article is burned is sufficient such that the flame retardance is good. Moreover, if the viscosity-average molecular weight is no more than 40000, the melt fluidity of the obtained polycarbonate resin composition is good. Moreover, the viscosity-average molecular weight is a molecular weight measured by the above method.

In the polycarbonate resin composition of this invention, other resins can be mixed without compromise to the good heat resistance, impact resistance, and flame retardance, etc. inherent to the polycarbonate resin. Specifically, the following reins can be mixed in an amount of no more than 50 parts by mass based on 100 parts by mass of the polycarbonate resin (A): styrene-based resins, such as acrylonitrile-butadiene-styrene (ABS), high-impact polystyrene (HIPS), polystyrene (PS), and poly(p-acetoxystyrene) (PAS); acrylic acid-based resins, such as polymethyl methacrylate; polyolefin-based resins, such as polyethylene and polypropylene; polyester-based resins, such as polyethylene terephthalate and polybutylene terephthalate; nylon-based resins, such as 6-nylon or 6,6-nylon; and elastomers, polyphenylene ether, polyarylate, polyphenylene sulfide, polyether ketone, polyether ether ketone, polysulfone, polyethersulfone, polyamide-imide, polyetherimide, and polyacetal, etc.

[Organic Metal Salt (C)]

In this invention, various metal salts previously used to provide flame retardance to a polycarbonate resin can be used as the organic metal salt (C). In particular, metal salts of organic sulfonic acids are preferred. Specific examples of the metal salts of organic sulfonic acids include, e.g., metal salts of aliphatic sulfonic acids, metal salts of aromatic sulfonic acids, and metal salts of polymeric aromatic sulfonic acids. Moreover, the metal salts of the above sulfonic acids can also have a hydrocarbon group that is partially or fully fluorinated.

Specific examples of the metal salts of organic sulfonic acids include, e.g., potassium salt of 4-methyl-N-(4-methylphenyl)sulfonyl-benzenesulfonamide, potassium diphenyl-sulfone-3-sulfonate, potassium diphenylsulfone-3,3'-disulfonate, sodium p-toluenesulfonate, disodium diphenylsulfide-4,4'-disulfonate, dipotassium diphenylsulfide-4,4'-disulfonate, calcium 1-methoxynaphthalene-4-sulfonate, disodium 4-dodecylphenylene oxide disulfonate, polysodium poly(2,6-dimethylphenylene oxide)polysulfonate, polysodium poly(1,3-phenylene oxide)polysulfonate, polysodium poly(1,4-phenylene oxide)polysulfonate, polypotassium poly(2,6-diphenylphenylene oxide) polysulfonate, lithium poly(2-fluoro-6-butylphenylene oxide)polysulfonate, potassium trifluoromethanesulfonate, potassium perfluorobutanesulfonate, potassium perfluorooctanesulfonate, sodium pentafluoroethanesulfonate, potassium monofluoromethanesulfonate, sodium monofluoromethanesulfonate, sodium 2,4-difluorobenzenesulfonate, potassium 2,4-difluorobenzenesulfonate, sodium 3,4-difluorobenzenesulfonate, potassium 3,4-difluorobenzenesulfonate, sodium 2-trifluoromethylbenzenesulfonate, potassium 2-trifluoromethylbenzenesulfonate, sodium 4,4'-difluorobiphenyl-3-sulfonate, potassium 4,4'-difluorobiphenyl-3-sulfonate, sodium 4,4'-difluorodiphenylsulfide-3-sulfonate, potassium 4,4'-difluorodiphenylsulfide-3-sulfonate, disodium tetrafluorodiphenylene oxide disulfonate, dipotassium tetrafluorodiphenylene oxide disulfonate, and lithium poly(2-fluoro-6-butylphenylene oxide)polysulfonate. Among them, from the perspective of good thermal stability of the resin composition obtained by mixing the metal salt in the polycarbonate resin (A), a metal salt of a fluorine-free organic sulfonic acid is preferred.

The content of the organic metal salt (C) in the polycarbonate resin composition of this invention is decided according to the perspective of flame retardance performance of the resin composition and the addition efficiency of the organic metal salt (C). If the content is too low, the flame retardance effect is insufficient. On the other hand, if the content is too high, increase in the effect corresponding to an increase in content either cannot be expected. Therefore, the content thereof is, based on 100 parts by mass of the polycarbonate resin (A), preferably 0.001 to 2 parts by mass, more preferably 0.01 to 1 part by mass, and even more preferably 0.02 to 0.5 parts by mass.

The content of the resin modifier (B) in the polycarbonate resin composition of this invention is, based on 100 parts by mass of the polycarbonate resin (A), preferably 0.001 to 30 parts by mass, more preferably 0.01 to 10 parts by mass, even more preferably 0.05 to 5 parts by mass, and most preferably 0.1 to 3 parts by mass. If the content of the resin modifier (B) is at least 0.001 parts by mass, the effect of increasing the melt tension of the resin composition is sufficient. As a result, falling of flame drops when the molded article is burned is readily prevented. If the content of the resin modifier (B) is no more than 30 parts by mass, the melt fluidity of the obtained polycarbonate resin composition is good.

Moreover, if required, a known additive can be mixed in the polycarbonate resin composition of this invention to provide various functions to the molded article or improve characteristics of the same. Specific examples of the additive include, e.g., an antioxidant, a UV absorbent, a light stabilizer, a mold-release agent, a lubricant, a slip agent, a colorant (a pigment such as carbon black or titanium oxide, or a dye), a fluorescent whitening agent, a light-storing pigment, a fluorescent dye, and an antistatic agent. Moreover, to increase the strength and the rigidity of the molded article to increase flame retardance, the molded article can contain a filler material such as talc, mica, calcium carbonate, glass fiber, carbon fiber, or potassium titanate fiber. Moreover, to increase the impact resistance of the molded article, a rubber-like elastomer containing a core-shell 2-layer structure can be mixed.

[Antioxidant]

The antioxidant is not particularly limited, as long as it is an antioxidant used during ordinary molding. Specific examples of the antioxidant are, e.g., a phenol-based antioxidant, a phosphite-based antioxidant, and a sulfur-based antioxidant. By mixing these antioxidants, oxidative decomposition of the resin when the molded article is made by the polycarbonate resin composition, or tone variation of the molded article when exposed to heat or light, etc. can be suppressed.

Specific examples of the phenol-based antioxidant are, e.g., Vitamin E, tris[N-(3,5-di-t-butyl-4-hydroxybenzyl]isocyanurate (ADEKA Corporation; such as ADK Stab AO-20), tetrakis[3-(3,5-di-t-butyl-4-hydroxyphenyl)propionyl oxymethyl]methane (by Ciba Specialty Chemicals Co., Ltd.; such as Irganox 1010), triethylene glycol bis[3-(3-t-butyl-4-hydroxy-5-methylphenyl)propionate] (by Ciba Specialty Chemicals Co., Ltd.; such as Irganox 245), 3,9-bis[2-[3-(3-t-butyl-4-hydroxy-5-methylphenyl)propionyloxy]-1,1-dimethylethyl)-2,4,8,10-tetraoxaspiro[5.5]undecane (by ADEKA Corporation; such as ADK Stab AO-80), octadecyl 3-(3,5-di-t-butyl-4-hydroxyphenyl)propionate (by Ciba Specialty Chemicals Co., Ltd.; such as Irganox 1076), and so on.

Specific examples of the phosphite-based antioxidant include, e.g., triphenyl phosphite (by ADEKA Corporation; like ADK Stab TPP), tridecyl phosphite (by ADEKA Corporation; like ADK Stab 3010), octadecyl bis(2,6-di-t-butyl-4-methylphenyl)pentaerythritol phosphite (by ADEKA Corporation; like ADK Stab PEP-36), tris(2,4-di-t-butylphenyl) phosphite (by ADEKA Corporation, like ADK Stab 2112), 2,2-methylene-bis(4,6-di-t-butylphenyl)octyl phosphite (by ADEKA Corporation, like ADK Stab HP-10), and so on.

Specific examples of the sulfur-based antioxidant are, e.g., dilauryl thiodipropionate (by Yoshitomi Fine Chemicals, Ltd., such as Yoshinox DLTP) and dimyristyl 3,3'-thiodipropionate (by Yoshitomi Fine Chemicals, Ltd., such as Yoshinox DMTP), etc.

The content of the antioxidant in the polycarbonate resin composition of this invention is decided in view of the antioxidant performance of the resin composition and the addition efficiency of the antioxidant. If the content is too low, the effect is insufficient. On the other hand, if the content is too high, an increase in the effect corresponding to the increase in content either cannot be expected. Hence, the content thereof is, based on 100 parts by mass of the polycarbonate resin (A), preferably 0 to 2 parts by mass, more preferably 0.001 to 2 parts by mass, and even more preferably 0.001 to 1 part by mass.

The resin composition containing the polycarbonate resin (A), the organic metal salt (C), and the resin modifier (B) is prepared as a powder mixture or a melt-kneaded product. At this point, a Henschel mixer, a Banbury mixer, a single-screw extruder, a twin-screw extruder, a double-roller mill, a kneading machine, or a Brabender, etc., is used. Moreover, it is also possible to firstly prepare a master batch in which the content of the resin modifier (B) and/or the organic metal salt (C) is large and the resin modifier (B) and/or the organic metal salt (C) and the polycarbonate resin (A) are mixed, and then mix the master batch with the polycarbonate resin (A) again, so as to obtain the desired resin composition. The temperature of the mixing and/or kneading is not particularly limited, as long as it is properly selected and decided within the range of 240° C. to 320° C.

<Molded Article>

The molded article of this invention is made by molding the above polycarbonate resin composition. Examples of the molding method include, e.g., compression molding, transfer molding, injection molding, blow molding, extrusion molding, laminate molding, and roll molding. The molding temperature of the resin composition is not particularly limited. The higher the molding temperature, the better the fluidity of the molten mass of the resin composition. However, an excessive molding temperature facilitates the decomposition of the resin composition, so the molding temperature is preferably 285° C. to 340° C., and more preferably 290° C. to 320° C. The thickness of the molded article is preferably 0.1 to 2 mm.

The molded article of this invention has characteristics such as good mechanical strength, heat resistance, electrical characteristics, and dimensional stability of polycarbonate resin, and also has good flame retardance and good thermal stability when molded under high temperature. The molded article of this invention can be used in representative fields such as the automotive field, the OA equipment field, the electrical/electronic equipment field and the building material field, and in a wide range of other fields.

EXAMPLES

This invention is further described with the examples below. Before the examples are described, the evaluation methods of Preparation Example 1 to Preparation Example 15 for resin modifier (B-1) to resin modifier (B-15) and the resin compositions are described. In the following description, "parts" refers to "parts by mass" and "%" refers to "mass %".

(1) Evaluation of Thermal Stability of Resin Composition

A pellet of polycarbonate resin composition was used for the resin composition.

(1-1) Thermal Decomposition Resistance

In this evaluation, "ΔMFR" defined by the equation below was used as an indicator of thermal decomposition resistance of the resin composition. It can be determined that, the smaller the value, the better the thermal decomposition resistance of the resin composition.

A melt indexer (model S-111, made by Toyo Seiki Co., Ltd.) was used to measure the melt mass-flow rate (MFR) of the pellet with the following steps. First, the MFR of the pellet was measured under the conditions of a cylinder temperature of 320° C. and a load of 1.2 kg according to ISO1133, and the MFR was designated as $MFR_B$. Moreover, after the other pellets were left in the cylinder at a temperature of 320° C., the MFR was measured under the condition of a load of 1.2 kg according to ISO1133, and the MFR was designated as $MFR_A$.

$$\Delta MFR = (MFR_A - MFR_B)/MFR_B \times 100(\%).$$

(1-2) Heat Coloring Resistance

The evaluation of heat coloring resistance of the resin composition was performed with the yellowness index (YI) value of a slab made from the resin composition. It can be determined that, the smaller the value, the less the yellowness and the better the tone of the resin composition.

The YI value of the slab was measured by a reflected-light measurement method under the conditions of a C-light source and a viewing angle of 2° with a light-splitting colorimeter (model SE2000, made by Nippon Denshoku Industries, Co., Ltd.) according to JIS K7105. Dimensions of the slab were a length of 100 mm, a width of 50 mm, and a thickness of 2 mm.

The pellet was provided to a 100 t injection molding machine (model SE-100DU, made by Sumitomo Heavy Industries Co., Ltd.) having a cylinder temperature set to 300° C. such that injection molding was performed on the pellet after being left in the cylinder for 15 minutes. A slab having a length of 100 mm, a width of 50 mm, and a thickness of 2 mm was thus obtained. Then, the YI value of the obtained slab was measured.

(2) Evaluation of Flame Retardance of Resin Composition

The evaluation was performed on the flame retardance of a test piece made from the resin composition.

A pellet of the polycarbonate resin composition was provided to a 100 t injection molding machine (model SE-100DU, made by Sumitomo Heavy Industries Co., Ltd.) having a cylinder temperature set to 300° C., and a test piece having a thickness of 1/16 inches was obtained by injection molding. A perpendicular burn test was performed on the obtained test piece according to UL-94 specifications of Underwriters Laboratories Incorporation. The number of test pieces was set at 5, and each test piece was observed 10 seconds after contact with flame. A UL grade was provided with the following criteria.

TABLE 1

| UL-grade | V-0 | V-1 | V-2 |
|---|---|---|---|
| Burn time $T_1$ (sec) of each test piece | ≤10 | ≤30 | ≤30 |
| Total burn time $T_2$ (sec) of all test pieces | ≤50 | ≤250 | ≤250 |
| Burning of absorbent cotton caused by flame drops falling from all test pieces | Not burnt | Not burnt | — |
| Burning of absorbent cotton caused by flame drops falling from 1 to 4 test pieces | Not burnt | Not burnt | Burnt |

Preparation Example 1

6.0 parts of dipotassium alkenylsuccinate used as the emulsifier and 230 parts of distilled water were added to a detachable flask having a volume of 2 L provided with a stirring blade, a condenser, a thermocouple, and a nitrogen inlet. Then, the components were stirred in nitrogen gas at room temperature for 30 minutes. The above dipotassium alkenylsuccinate was used in the form of being dissolved in a portion of the above distilled water.

Then, the temperature of the solution in the flask was raised to 70° C., and then a solution formed by dissolving 0.2 parts of potassium persulfate in 3 parts of distilled water was added to the flask. Then, a mixture containing 50 parts of methyl methacrylate, 40 parts of styrene, 10 parts of n-butyl acrylate, and 0.1 part of n-octyl mercaptan was added dropwise to the flask over 4 hours to perform a free-radical polymerization. After the dropwise addition, the mixture was stirred for 1 hour while the temperature of the solution in the flask was maintained at 70° C. to obtain a latex (p2-1) containing the vinyl polymer (p2). The content of the vinyl polymer (p2) in the emulsifier was 30%.

166.7 parts of the latex (p2-1) and 83.3 parts of a latex "Fluon AD939E" (by Asahi Glass Co., Ltd., with a PTFE concentration of 60%, a mass-average molecular weight of PTFE of ~15 million, and a concentration of polyoxy alkylene alkyl ether of 3%) containing the PTFE-based polymer (p1) were added to a reaction vessel having a stirring apparatus. The components were then stirred for 5 minutes to obtain a latex (d-1). In the latex, the content of the PTFE was 50 parts, the content of the polyoxy alkylene alkyl ether was 2.5 parts, and the content of the vinyl polymer (p2) was 50 parts.

Then, 325 parts of an aqueous solution of calcium acetate containing 5.0 parts of calcium acetate as the coagulation agent was added to a flask having a volume of 10 L, and then the aqueous solution was heated to a temperature of 80° C. Then, the latex (d-1) was slowly added dropwise to the aqueous solution under stirring, such that the polymer was coagulated and a slurry was obtained. Then, after the temperature of the slurry was raised to 90° C., the slurry was continuously stirred for 5 minutes. Then, the obtained precipitate was separated from the slurry, and then filtration, water-washing and drying were performed, so as to obtain 100 parts of a powder resin modifier (B-1).

Preparation Example 2

1.0 part of dipotassium alkenylsuccinate and 230 parts of distilled water were added to a detachable flask provided with a stirring blade, a condenser, a thermocouple, and a nitrogen inlet. Then, the components were stirred in nitrogen gas at room temperature for 30 minutes. The above dipotassium alkenylsuccinate was used in the form of being dissolved in a portion of the above distilled water.

Then, the temperature of the solution in the flask was raised to 70° C., and then a solution formed by dissolving a mixture containing 0.0005 parts of ferrous sulfate, 0.0015 parts of disodium ethylene diaminetetraacetate, and 0.2 parts of rongalite in 3 parts of distilled water was added to the flask. Then, a mixture containing 50 parts of methyl methacrylate, 40 parts of styrene, 10 parts of n-butyl acrylic acid, 0.1 parts of n-octyl mercaptan, and 0.2 parts of t-butyl hydroperoxide was added dropwise to the flask over 4 hours to perform a free-radical polymerization. After the dropwise addition, the mixture was stirred for 1 hour while the temperature of the solution in the flask was maintained at 70° C. to obtain a latex (p2-2) containing the vinyl polymer (p2). The content of (p2) in the emulsifier was 30%.

Then, 100 parts of a resin modifier (B-2) was obtained with the same method of Preparation Example 1, except that the latex (p2-2) was used instead of the latex (p2-1) obtained in Preparation Example 1 and calcium chloride was used instead of calcium acetate.

Preparation Example 3

100 parts of a resin modifier (B-3) was obtained with the same method of Preparation Example 1, except that the emulsifier was changed to 6.0 parts of potassium oleate.

Preparation Example 4

100 parts of a resin modifier (B-4) was obtained with the same method of Preparation Example 2, except that the emulsifier was changed to 1.0 part of potassium oleate.

Preparation Example 5

100 parts of a resin modifier (B-5) was obtained with the same method of Preparation Example 2, except that the monomer component used in the polymerization of the vinyl polymer (p2) was changed to a mixture containing 60 parts of methyl methacrylate, 30 parts of styrene, and 10 parts of n-butyl acrylate, and the coagulation agent was changed to 5.0 parts of calcium acetate.

Preparation Example 6

100 parts of a resin modifier (B-6) was obtained with the same method of Preparation Example 2, except that the emulsifier was changed to 1.0 part of sodium polyoxyethylene alkyl ether phosphate, and the coagulation agent was changed to 5.0 parts of calcium acetate.

Preparation Example 7

100 parts of a resin modifier (B-7) was obtained with the same method of Preparation Example 5, except that the monomer component used in the polymerization of the vinyl polymer (p2) was changed to a mixture containing 50 parts of methyl methacrylate and 50 parts of styrene.

Preparation Example 8

100 parts of a resin modifier (B-8) was obtained with the same method of Preparation Example 5, except that the monomer component used in the polymerization of the vinyl polymer (p2) was changed to a mixture containing 30 parts of methyl methacrylate and 70 parts of styrene, and the emulsifier was changed to 3.0 parts of dipotassium alkenylsuccinate.

Preparation Example 9

100 parts of a resin modifier (B-9) was obtained with the same method of Preparation Example 1, except that the emulsifier was changed to 1.0 part of dipotassium alkenylsuccinate, and the latex containing the PTFE-based polymer (p1) was changed to 83.3 parts of "Fluon AD915E" (by Asahi Glass Co., Ltd., with a PTFE concentration of 60%, a mass-average molecular weight of PTFE of about 3 million, and a concentration of polyoxyalkylene alkyl ether: 3%).

Preparation Example 10

100 parts of a resin modifier (B-10) was obtained with the same method of Preparation Example 1, except that the coagulation agent was changed to 0.3 parts of aluminum sulfate.

Preparation Example 11

100 parts of a resin modifier (B-11) was obtained with the same method of Preparation Example 4, except that the coagulation agent was changed to 5.0 parts of magnesium sulfate.

Preparation Example 12

100 parts of a resin modifier (B-12) was obtained with the same method of Preparation Example 1, except that the emulsifier was changed to 6.0 parts of sodium dodecylbenzenesulfonate.

Preparation Example 13

100 parts of a resin modifier (B-13) was obtained with the same method of Preparation Example 5, except that the monomer component used in the polymerization of the vinyl polymer (p2) was changed to a mixture containing 90 parts of methyl methacrylate and 10 parts of styrene.

Preparation Example 14

6.0 parts of dipotassium alkenylsuccinate, 80 parts of methyl methacrylate, 20 parts of n-butyl acrylate, 0.1 parts of n-octyl mercaptan, and 230 parts of distilled water were added to a detachable flask having a volume of 2 L provided with a stirring blade, a condenser, a thermocouple, and a nitrogen inlet. Then, the components were stirred in nitrogen gas at room temperature for 30 minutes. The above dipotassium alkenylsuccinate was used in the form of being dissolved in a portion of the above distilled water.

Then, the temperature of the solution in the flask was raised to 50° C., and then a solution formed by dissolving 0.2 part of potassium persulfate in 3 parts of distilled water was added to the flask, thereby initiating free-radical polymerization. After the polymerization and heat generation, the mixture was stirred for 2 hours while the temperature of the solution in the flask was maintained at 60° C. to obtain a latex (p2-14) containing the vinyl polymer (p2). The content of the vinyl polymer (p2) in the emulsifier was 30%.

100 parts of a resin modifier (B-14) was obtained with the same method of Preparation Example 1, except that the latex (p2-14) was used instead of the latex (p2-1) obtained in Preparation Example 1.

Preparation Example 15

100 parts of a resin modifier (B-15) was obtained with the same method of Preparation Example 5, except that the emulsifier was changed to 1.5 parts of sodium alkyl diphenyl ether disulfonate.

TABLE 2

| Preparation Example | Resin modifier (B) | Latex (p1) PTFE (%) | Latex (p1) Molecular weight | Preparation conditions of latex (p2) Mass composition ratio of vinyl monomer | Emulsifier Type | Emulsifier Parts by mass | coagulation agent Type | coagulation agent Parts by mass |
|---|---|---|---|---|---|---|---|---|
| 1 | B-1 | 60 | 150 million | MMA/St/BA = 50/40/10 | Dipotassium alkenylsuccinate | 6.0 | Calcium acetate | 5.0 |
| 2 | B-2 | 60 | 150 million | MMA/St/BA = 50/40/10 | Dipotassium alkenylsuccinate | 1.0 | Calcium chloride | 5.0 |
| 3 | B-3 | 60 | 150 million | MMA/St/BA = 50/40/10 | Potassium oleate | 6.0 | Calcium acetate | 5.0 |
| 4 | B-4 | 60 | 150 million | MMA/St/BA = 50/40/10 | Potassium oleate | 1.0 | Calcium chloride | 5.0 |
| 5 | B-5 | 60 | 150 million | MMA/St/BA = 60/30/10 | Dipotassium alkenylsuccinate | 1.0 | Calcium acetate | 5.0 |
| 6 | B-6 | 60 | 150 million | MMA/St/BA = 50/40/10 | Sodium polyoxyethylene alkyl ether phosphate | 1.0 | Calcium acetate | 5.0 |
| 7 | B-7 | 60 | 150 million | MMA/St = 50/50 | Dipotassium alkenylsuccinate | 1.0 | Calcium acetate | 5.0 |
| 8 | B-8 | 60 | 150 million | MMA/St = 30/70 | Dipotassium alkenylsuccinate | 3.0 | Calcium acetate | 5.0 |
| 9 | B-9 | 60 | 30 million | MMA/St/BA = 50/40/10 | Dipotassium alkenylsuccinate | 1.0 | Calcium acetate | 5.0 |
| 10 | B-10 | 60 | 150 million | MMA/St/BA = 50/40/10 | Dipotassium alkenylsuccinate | 6.0 | Aluminum sulfate | 0.3 |
| 11 | B-11 | 60 | 150 million | MMA/St/BA = 50/40/10 | Potassium oleate | 1.0 | Magnesium sulfate | 5.0 |
| 12 | B-12 | 60 | 150 million | MMA/St/BA = 50/40/10 | Sodium dodecylbenzenesulfonate | 6.0 | Calcium acetate | 5.0 |
| 13 | B-13 | 60 | 150 million | MMA/St = 90/10 | Dipotassium alkenylsuccinate | 1.0 | Calcium acetate | 5.0 |
| 14 | B-14 | 60 | 150 million | MMA/BA = 80/20 | Dipotassium alkenylsuccinate | 6.0 | Calcium acetate | 5.0 |
| 15 | B-15 | 60 | 150 million | MMA/St/BA = 50/40/10 | Sodium alkyl diphenyl ether disulfonate | 1.5 | Calcium acetate | 5.0 |

Latex (p1): latex containing the PTFE-based polymer (p1)

Latex (p2): latex containing the vinyl polymer (p2)

The resin modifiers made in Preparation Examples 1 to 15 are summarized in Table 2. Moreover, the symbols recited in the column of vinyl monomers in Table 2 refer to the compounds recited in Table 5. The parts by mass of the emulsifiers in Table 2 are amounts based on 100 parts by mass of the vinyl monomers. Moreover, the parts by mass of the coagulation agents are amounts based on 100 parts by mass of the polymer in the latex (d).

Examples 1 to 16 and Comparative Examples 1 to 8

Each material was prepared according to Table 3 or 4 to obtain the polycarbonate resin compositions. Each resin composition was provided to a unidirectional biaxial extruder (model: PCM-30, made by Ikegai Corp.) and then melted and kneaded at a barrel temperature of 280° C., thus obtaining a pellet. The obtained pellets were used to evaluate the characteristics of the resin compositions, and the evaluation results are shown in Table 3 or 4. Moreover, the labels recited in the columns of the PC resin, the organic metal salts (C), and the antioxidants in Table 3 and Table 4 refer to the compounds shown in Table 5.

TABLE 3

| | Resin composition | | | | | | | | | Flame retardance | | | |
|---|---|---|---|---|---|---|---|---|---|---|---|---|---|
| | PC resin (A) (parts by mass) | Resin modifier (B) | | Organic metal salt (C) (parts by mass) | | Antioxidant (parts by mass) | | Thermal stability | | Longest burn time (sec) of one test piece | Total burn time (sec) | Flame drops | UL-grade |
| | | Type | Parts by mass | F-114 | KSS | Irg245 | PEP36 | ΔMFR (%) | YI value | | | | |
| Example 1 | 100 | B-1 | 1 | 0.05 | — | 0.1 | 0.1 | 26 | −23 | 2 | 6 | Not burnt | V-0 |
| Example 2 | 100 | B-2 | 1 | 0.05 | — | 0.1 | 0.1 | 22 | −27 | 5 | 12 | Not burnt | V-0 |
| Example 3 | 100 | B-3 | 1 | 0.05 | — | 0.1 | 0.1 | 27 | −24 | 5 | 20 | Not burnt | V-0 |
| Example 4 | 100 | B-4 | 1 | 0.05 | — | 0.1 | 0.1 | 15 | −27 | 2 | 10 | Not burnt | V-0 |
| Example 5 | 100 | B-5 | 1 | 0.05 | — | 0.1 | 0.1 | 22 | −27 | 2 | 8 | Not burnt | V-0 |
| Example 6 | 100 | B-6 | 1 | 0.05 | — | 0.1 | 0.1 | 19 | −24 | 3 | 12 | Not burnt | V-0 |
| Example 7 | 100 | B-7 | 1 | 0.05 | — | 0.1 | 0.1 | 22 | −25 | 2 | 10 | Not burnt | V-0 |
| Example 8 | 100 | B-8 | 1 | 0.05 | — | 0.1 | 0.1 | 13 | −27 | 2 | 7 | Not burnt | V-0 |
| Example 9 | 100 | B-9 | 1 | 0.05 | — | 0.1 | 0.1 | 21 | −26 | 7 | 20 | Not burnt | V-0 |
| Comparative Example 1 | 100 | B-10 | 1 | 0.05 | — | 0.1 | 0.1 | 45 | −8 | 5 | 17 | Not burnt | V-0 |
| Comparative Example 2 | 100 | B-11 | 1 | 0.05 | — | 0.1 | 0.1 | 41 | −15 | 12 | 42 | Not burnt | V-1 |
| Comparative Example 3 | 100 | B-12 | 1 | 0.05 | — | 0.1 | 0.1 | 87 | −4 | 16 | 49 | Not burnt | V-1 |
| Comparative Example 4 | 100 | B-13 | 1 | 0.05 | — | 0.1 | 0.1 | 37 | −19 | 3 | 14 | Not burnt | V-0 |
| Comparative Example 5 | 100 | B-14 | 1 | 0.05 | — | 0.1 | 0.1 | 47 | −17 | 3 | 19 | Not burnt | V-0 |

TABLE 4

| | Resin composition | | | | | | | | | Flame retardance | | | |
|---|---|---|---|---|---|---|---|---|---|---|---|---|---|
| | PC resin (A) (parts by mass) | Resin modifier (B) | | Organic metal salt (C) (parts by mass) | | Antioxidant (parts by mass) | | Thermal stability | | Longest burn time (sec) of one test piece | Total burn time (sec) | Flame drops | UL-grade |
| | | Type | Parts by mass | F-114 | KSS | Irg245 | PEP36 | ΔMFR (%) | YI value | | | | |
| Example 10 | 100 | B-1 | 1 | — | 0.3 | 0.1 | 0.1 | 13 | −23 | 2 | 8 | Not burnt | V-0 |
| Example 11 | 100 | B-2 | 1 | — | 0.3 | 0.1 | 0.1 | 13 | −27 | 6 | 20 | Not burnt | V-0 |
| Example 12 | 100 | B-4 | 1 | — | 0.3 | 0.1 | 0.1 | 10 | −27 | 3 | 10 | Not burnt | V-0 |
| Example 13 | 100 | B-5 | 1 | — | 0.3 | 0.1 | 0.1 | 14 | −25 | 5 | 19 | Not burnt | V-0 |
| Example 14 | 100 | B-6 | 1 | — | 0.3 | 0.1 | 0.1 | 11 | −24 | 4 | 15 | Not burnt | V-0 |
| Example 15 | 100 | B-7 | 1 | — | 0.3 | 0.1 | 0.1 | 17 | −23 | 8 | 21 | Not burnt | V-0 |
| Example 16 | 100 | B-9 | 1 | — | 0.3 | 0.1 | 0.1 | 14 | −24 | 8 | 23 | Not burnt | V-0 |

TABLE 4-continued

| | Resin composition | | | | | | Thermal stability | | Flame retardance | | | |
| | PC resin (A) (parts by mass) | Resin modifier (B) | | Organic metal salt (C) (parts by mass) | | Antioxidant (parts by mass) | | | Longest burn time (sec) of one test piece | Total burn time (sec) | Flame drops | UL-grade |
| | | Type | Parts by mass | F-114 | KSS | Irg245 | PEP36 | ΔMFR (%) | YI value | | | | |
| Comparative Example 6 | 100 | B-11 | 1 | — | 0.3 | 0.1 | 0.1 | 34 | −22 | 16 | 65 | Not burnt | V-1 |
| Comparative Example 7 | 100 | B-15 | 1 | — | 0.3 | 0.1 | 0.1 | 45 | −14 | 30 | 128 | Burnt | V-2 |
| Comparative Example 8 | 100 | B-13 | 1 | — | 0.3 | 0.1 | 0.1 | 32 | −19 | 7 | 25 | Not burnt | V-0 |

TABLE 5

| Symbol | Compound |
|---|---|
| MMA | Methyl methacrylate |
| St | Styrene |
| BA | n-butyl acrylate |
| PC resin | Aromatic polycarbonate resin "Iupilon S-2000F", viscosity-average molecular weight: 23000, made by Mitsubishi Engineering Plastics Corporation |
| F-114 | Potassium perfluorobutanesulfonate "Megafac F-114", by DIC Corporation |
| KSS | Potassium diphenylsulfone-3-sulfonate "ChemGuard-KSS", by Chembridge International Corporation |
| Irg245 | Phenol-based antioxidant "Irganox 245", by Ciba Specialty Chemicals Co., Ltd. |
| PEP36 | Phosphite-based antioxidant "ADK Stab PEP-36", made by ADEKA |

It is clear from Examples 1 to 16 that, the thermal decomposition resistance of the polycarbonate resin composition of this invention is good, and even if the polycarbonate resin composition is molded after being left under high temperature, coloring is still difficult, and flame retardance is still good.

In Comparative Examples 1, 2 and 6, since a sulfate salt was used as the coagulation agent, the thermal stability and/or the flame retardance of the resin compositions is poor. Since the content of the aromatic vinyl monomer unit in the vinyl polymer of the resin compositions of Comparative Examples 4, 5 and 8 is small, the thermal stability thereof is poor. Since the vinyl polymer of the resin compositions of Comparative Examples 3 and 7 were polymerized in the presence of a sulfonic acid-based emulsifier, the thermal stability and flame retardance thereof are poor.

INDUSTRIAL APPLICABILITY

With the resin modifier of this invention, a polycarbonate resin composition with good flame retardance and good thermal stability when molded under high temperature without use of a bromine-based or phosphorus-based compound can be provided.

The molded article of this invention can be used in representative fields such as the automotive field, the OA equipment field, the electrical/electronic equipment field, and the building material field, and in a wide range of other fields.

The invention claimed is:

1. A resin modifier (B) comprising:
a tetrafluoroethylene-based polymer (p1); and
a vinyl polymer (p2) other than the polymer (p1),
wherein the resin modifier (B) is obtained by using an alkaline earth metal salt or alkali metal salt other than a sulfate salt to coagulate a latex containing the tetrafluoroethylene-based polymer (p1) and the vinyl polymer (p2) other than the polymer (p1),
wherein the vinyl polymer (p2) is obtained by polymerizing a vinyl monomer (X) comprising 20 to 75 mass % of an aromatic vinyl monomer (x1), and a (meth)acrylate ester (x2) in the presence of at least one emulsifier selected from the group consisting of a phosphoric acid-based emulsifier, a carboxylic acid-based emulsifier and a nonionic emulsifier,
wherein the (meth)acrylate ester (x2) contains an ester moiety —C(=O)—O—R, where R is an alkyl group having 1 to 20 carbons or an aromatic group, and comprises at least one selected from the group consisting of methyl(meth)acrylate, ethyl(meth)acrylate and n-propyl(meth)acrylate,
wherein a resin composition comprising the resin modifier (B) meets the following conditions (1) and (2), the resin composition comprising:
1 part by mass of the resin modifier (B),
100 parts by mass of a polycarbonate resin represented by formula (1) and having a viscosity-average molecular weight (Mv) of 23000,
0.1 part by mass of a phenol-based antioxidant represented by formula (2),
0.1 part by mass of a phosphite-based antioxidant represented by formula (3), and
0.05 parts by mass of potassium perfluorobutanesulfonate or 0.3 part by mass of potassium diphenylsulfone-3-sulfonate,
where the viscosity-average molecular weight of the polycarbonate resin is obtained by measuring a limiting viscosity [η] of a 0.5 g/dL methylene chloride solution at 25° C. with a Ubbelohde viscometer and the following equation:

$$[\eta] = 1.23 \times 10^{-4} Mv^{0.83};$$

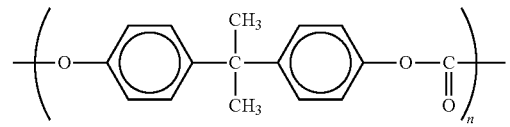

(1)

(2)

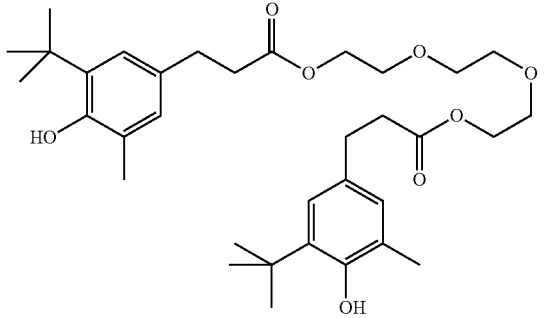

(3)

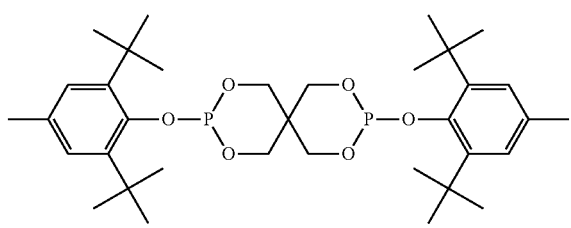

where the condition (1) is:

$\Delta MFR = (MFR_A - MFR_B)/MFR_B \times 100(\%) \leq 30(\%)$, wherein $MFR_B$ is a melt mass-flow rate of the resin composition measured under conditions of a cylinder temperature of 320° C. and a load of 1.2 kg according to ISO1133, and $MFR_A$ is a melt mass-flow rate of the resin composition measured, after being left in a cylinder at a temperature of 320° C. for 15 minutes, under a condition of a load of 1.2 kg according to ISO1133; and wherein the condition (2) is:

YI (yellowness index) value of a slab≤−20;

wherein the YI value of the slab is measured by a reflected-light measurement method under conditions of a C-light source and a viewing angle of 2 degrees with a light-splitting colorimeter according to JIS K7105, dimensions of the slab are a length of 100 mm, a width of 50 mm, and a thickness of 2 mm, and the slab is made by performing an injection molding after the resin composition is left in a cylinder of an injection molding machine at a cylinder temperature set at 300° C. for 15 minutes.

2. The resin modifier (B) of claim 1, wherein the mass-average molecular weight of the tetrafluoroethylene-based polymer (p1) is 1 million to 50 million.

3. The resin modifier (B) of claim 1, wherein the tetrafluoroethylene-based polymer (p1) is present in an amount of 30 mass % to 70 mass % based on a total of 100 mass % of the tetrafluoroethylene-based polymer (p1) and the vinyl polymer (p2).

4. The resin modifier (B) of claim 1, wherein the vinyl polymer (p2) is obtained by polymerizing 100 parts by mass of the vinyl monomer (X) in the presence of the emulsifier of more than 1.5 parts by mass and no more than 10 parts by mass.

5. The resin modifier (B) of claim 1, wherein the (meth) acrylate ester (x2) further comprises n-butyl acrylate.

6. The resin modifier (B) of claim 1, wherein the (meth) acrylate ester (x2) comprises methyl(meth)acrylate.

7. The resin modifier (B) of claim 1, wherein the (meth) acrylate ester (x2) comprises methyl(meth)acrylate and n-butyl acrylate.

8. The resin modifier (B) of claim 1, wherein the vinyl monomer (X) comprises 30 to 70 mass % of the aromatic vinyl monomer (x1).

9. The resin modifier (B) of claim 1, wherein the vinyl monomer (X) comprises 30 to 70 mass % of styrene as the aromatic vinyl monomer (x1).

10. The resin modifier (B) of claim 1, wherein after the aggregation, the obtained precipitate is converted to a powder, where each particle of the powder contains tetrafluoroethylene-based polymer (p1) in an amount of 30 mass % to 70 mass % based on a total of 100 mass % of the tetrafluoroethylene-based polymer (p1) and the vinyl polymer (p2).

11. A polycarbonate resin composition containing a polycarbonate resin (A), an organic metal salt (C), and the resin modifier (B) of claim 1.

12. The polycarbonate resin composition of claim 11, wherein a content of the organic metal salt (C) is 0.001 to 2 parts by mass, and a content of the resin modifier (B) is 0.001 to 30 parts by mass, based on 100 parts by mass of the polycarbonate resin (A).

13. The polycarbonate resin composition of claim 11, wherein the organic metal salt (C) is a metal salt of a fluorine-free organic sulfonic acid.

14. A molded article obtained by molding the polycarbonate resin composition of claim 11.

15. A method for manufacturing a molded article, comprising molding the polycarbonate resin composition of claim 11 at a temperature of 285° C. to 340° C.

16. A method for producing a resin modifier (B), comprising:

coagulating a latex containing a tetrafluoroethylene-based polymer (p1) and a vinyl polymer (p2) other than the polymer (p1) in the presence of an alkaline earth metal salt or alkali metal salt other than a sulfate salt, wherein the vinyl polymer (p2) is obtained by polymerizing a vinyl monomer (X) comprising 20 to 75 mass % of an aromatic vinyl monomer (x1), and a (meth) acrylate ester (x2) in the presence of at least one emulsifier selected from the group consisting of a phosphoric acid-based emulsifier, a carboxylic acid-based emulsifier, and a nonionic emulsifier, wherein the (meth)acrylate ester (x2) contains an ester moiety —C(=O)—O—R, where R is an alkyl group having 1 to 20 carbons or an aromatic group, and comprises at least one selected from the group consisting of methyl(meth)acrylate, ethyl(meth)acrylate and n-propyl(meth)acrylate, wherein a resin composition comprising the resin modifier (B) meets the following conditions (1) and (2), the resin composition comprising:

1 part by mass of the resin modifier (B), 100 parts by mass of a polycarbonate resin represented by formula (1) and having a viscosity-average molecular weight (Mv) of 23000, 0.1 part by mass of a phenol-based antioxidant represented by formula (2), 0.1 part by mass of a phosphite-based antioxidant represented by formula (3), and 0.05 parts by mass of potassium perfluorobutanesulfonate or 0.3 part by mass of potassium diphenylsulfone-3-sulfonate, where the viscosity-average molecular weight of the polycarbonate resin is obtained by measuring a limiting viscosity [η] of a 0.5 g/dL methylene chloride solution at 25° C. with a Ubbelohde viscometer and the following equation:

$[\eta]=1.23\times10^{-4}Mv^{0.83}$;

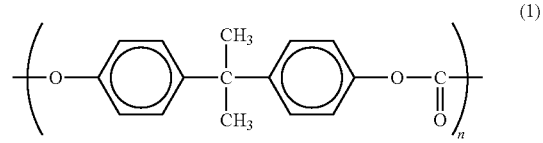
(1)

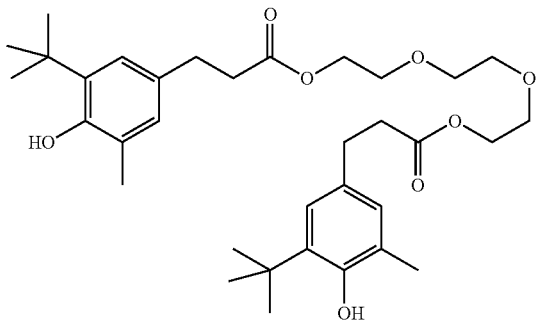
(2)

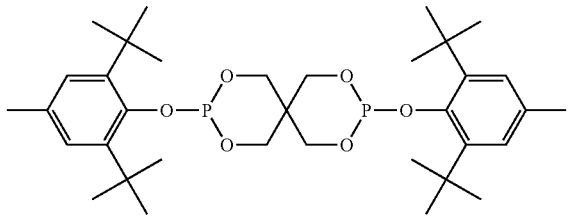
(3)

where the condition (1) is:

$\Delta MFR=(MFR_A-MFR_B)/MFR_B\times100(\%)\leq30(\%)$, wherein $MFR_B$ is a melt mass-flow rate of the resin composition measured under conditions of a cylinder temperature of 320° C. and a load of 1.2 kg according to ISO1133, and $MFR_A$ is a melt mass-flow rate of the resin composition measured, after being left in a cylinder at a temperature of 320° C. for 15 minutes, under a condition of a load of 1.2 kg according to ISO1133; and wherein the condition (2) is:

YI (yellowness index) value of a slab≤−20;

wherein the YI value of the slab is measured by a reflected-light measurement method under conditions of a C-light source and a viewing angle of 2 degrees with a light-splitting colorimeter according to JIS K7105, dimensions of the slab are a length of 100 mm, a width of 50 mm, and a thickness of 2 mm, and the slab is made by performing an injection molding after the resin composition is left in a cylinder of an injection molding machine at a cylinder temperature set at 300° C. for 15 minutes.

* * * * *